(12) United States Patent
Eliaz et al.

(10) Patent No.: US 8,781,008 B2
(45) Date of Patent: Jul. 15, 2014

(54) HIGHLY-SPECTRALLY-EFFICIENT TRANSMISSION USING ORTHOGONAL FREQUENCY DIVISION MULTIPLEXING

(71) Applicant: MagnaCom Ltd., Moshav Ben Shemen (IL)

(72) Inventors: Amir Eliaz, Moshav Ben Shemen (IL); Ilan Reuven, Ganey Tikva (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 13/921,665

(22) Filed: Jun. 19, 2013

(65) Prior Publication Data

US 2013/0343473 A1  Dec. 26, 2013

Related U.S. Application Data

(63) Continuation-in-part of application No. 13/755,008, filed on Jan. 31, 2013, now Pat. No. 8,571,131.

(60) Provisional application No. 61/662,085, filed on Jun. 20, 2012, provisional application No. 61/726,099, filed on Nov. 14, 2012, provisional application No. 61/729,774, filed on Nov. 26, 2012, provisional application No. 61/747,132, filed on Dec. 28, 2012, provisional application No. 61/768,532, filed on Feb. 24, 2013, provisional application No. 61/807,813, filed on Apr. 3, 2013.

(51) Int. Cl.
*H04K 1/10* (2006.01)

(52) U.S. Cl.
USPC ........... 375/260; 375/130; 375/267; 375/295; 341/106

(58) Field of Classification Search
USPC ......................................................... 375/260
See application file for complete search history.

(56) References Cited

U.S. PATENT DOCUMENTS

| | | | |
|---|---|---|---|
| 4,109,101 A | | 8/1978 | Mitani |
| 4,797,925 A | * | 1/1989 | Lin ................................ 704/223 |
| 5,283,813 A | | 2/1994 | Shalvi et al. |
| 5,394,439 A | * | 2/1995 | Hemmati ...................... 375/242 |
| 5,459,762 A | | 10/1995 | Wang et al. |
| 5,602,507 A | | 2/1997 | Suzuki |

(Continued)

OTHER PUBLICATIONS

Equalization: The Correction and Analysis of Degraded Signals, White Paper, Agilent Technologies, Ransom Stephens V1.0, Aug. 15, 2005 (12 pages).

(Continued)

*Primary Examiner* — Lihong Yu
(74) *Attorney, Agent, or Firm* — McAndrews, Held & Malloy, Ltd.

(57) ABSTRACT

A transmitter may map, using a selected modulation constellation, each of C' bit sequences to a respective one of C' symbols, where C' is a number greater than one. The transmitter may process the C' symbols to generate C' inter-carrier correlated virtual subcarrier values. The transmitter may decimate the C' virtual subcarrier values down to C physical subcarrier values, C being a number less than C'. The transmitter may transmit the C physical subcarrier values on C orthogonal frequency division multiplexed (OFDM) subcarriers. The modulation constellation may be an N-QAM constellation, where N is an integer. The processing may comprise filtering the C' symbols using an array of C' filter tap coefficients. The filtering may comprise cyclic filtering. The filtering may comprise multiplication by a circulant matrix populated with the C' filter tap coefficients.

24 Claims, 8 Drawing Sheets

(56) References Cited

U.S. PATENT DOCUMENTS

| | | | |
|---|---|---|---|
| 5,757,855 A | 5/1998 | Strolle et al. | |
| 5,784,415 A | 7/1998 | Chevillat et al. | |
| 5,818,653 A | 10/1998 | Park et al. | |
| 5,886,748 A | 3/1999 | Lee | |
| 5,889,823 A | 3/1999 | Agazzi et al. | |
| 5,915,213 A | 6/1999 | Iwatsuki et al. | |
| 5,930,309 A | 7/1999 | Knutson et al. | |
| 6,009,120 A | 12/1999 | Nobakht | |
| 6,167,079 A * | 12/2000 | Kinnunen et al. | 375/225 |
| 6,233,709 B1 | 5/2001 | Zhang et al. | |
| 6,272,173 B1 | 8/2001 | Hatamian | |
| 6,335,954 B1 | 1/2002 | Bottomley et al. | |
| 6,516,437 B1 | 2/2003 | Van Stralen et al. | |
| 6,535,549 B1 | 3/2003 | Scott et al. | |
| 6,697,441 B1 | 2/2004 | Bottomley et al. | |
| 6,785,342 B1 * | 8/2004 | Isaksen et al. | 375/284 |
| 6,871,208 B1 * | 3/2005 | Guo et al. | 708/401 |
| 6,968,021 B1 | 11/2005 | White et al. | |
| 6,985,709 B2 | 1/2006 | Perets | |
| 7,158,324 B2 | 1/2007 | Stein et al. | |
| 7,190,288 B2 * | 3/2007 | Robinson et al. | 341/106 |
| 7,205,798 B1 | 4/2007 | Agarwal et al. | |
| 7,206,363 B2 | 4/2007 | Hegde et al. | |
| 7,215,716 B1 | 5/2007 | Smith | |
| 7,467,338 B2 | 12/2008 | Saul | |
| 7,830,854 B1 | 11/2010 | Sarkar et al. | |
| 7,974,230 B1 | 7/2011 | Talley et al. | |
| 8,005,170 B2 | 8/2011 | Lee et al. | |
| 8,059,737 B2 | 11/2011 | Yang | |
| 8,175,186 B1 | 5/2012 | Wiss et al. | |
| 8,248,975 B2 | 8/2012 | Fujita et al. | |
| 8,351,536 B2 | 1/2013 | Mazet et al. | |
| 8,422,589 B2 | 4/2013 | Golitschek Edler Von Elbwart et al. | |
| 8,526,523 B1 | 9/2013 | Eliaz | |
| 8,548,072 B1 | 10/2013 | Eliaz | |
| 8,548,089 B2 | 10/2013 | Agazzi et al. | |
| 8,548,097 B1 | 10/2013 | Eliaz | |
| 8,553,821 B1 | 10/2013 | Eliaz | |
| 8,559,494 B1 | 10/2013 | Eliaz | |
| 8,559,496 B1 | 10/2013 | Eliaz | |
| 8,559,498 B1 | 10/2013 | Eliaz | |
| 8,565,363 B1 | 10/2013 | Eliaz | |
| 8,566,687 B1 | 10/2013 | Eliaz | |
| 8,571,131 B1 | 10/2013 | Eliaz | |
| 8,571,146 B1 | 10/2013 | Eliaz | |
| 8,572,458 B1 | 10/2013 | Eliaz | |
| 8,582,637 B1 | 11/2013 | Eliaz | |
| 8,599,914 B1 | 12/2013 | Eliaz | |
| 8,605,832 B1 | 12/2013 | Eliaz | |
| 2001/0008542 A1 | 7/2001 | Wiebke et al. | |
| 2002/0016938 A1 | 2/2002 | Starr | |
| 2002/0123318 A1 | 9/2002 | Lagarrigue | |
| 2002/0150065 A1 | 10/2002 | Ponnekanti | |
| 2002/0150184 A1 | 10/2002 | Hafeez et al. | |
| 2002/0172297 A1 | 11/2002 | Ouchi et al. | |
| 2003/0016741 A1 | 1/2003 | Sasson et al. | |
| 2003/0135809 A1 | 7/2003 | Kim | |
| 2003/0210352 A1 | 11/2003 | Fitzsimmons et al. | |
| 2004/0037374 A1 | 2/2004 | Gonikberg | |
| 2004/0120409 A1 * | 6/2004 | Yasotharan et al. | 375/260 |
| 2004/0170228 A1 | 9/2004 | Vadde | |
| 2004/0174937 A1 | 9/2004 | Ungerboeck | |
| 2004/0227570 A1 * | 11/2004 | Jackson et al. | 330/151 |
| 2005/0047517 A1 | 3/2005 | Georgios et al. | |
| 2005/0135472 A1 | 6/2005 | Higashino | |
| 2005/0220218 A1 | 10/2005 | Jensen et al. | |
| 2005/0265470 A1 | 12/2005 | Kishigami et al. | |
| 2005/0276317 A1 | 12/2005 | Jeong et al. | |
| 2006/0067396 A1 | 3/2006 | Christensen | |
| 2006/0109780 A1 | 5/2006 | Fechtel | |
| 2006/0171489 A1 | 8/2006 | Ghosh et al. | |
| 2006/0239339 A1 | 10/2006 | Brown et al. | |
| 2006/0245765 A1 | 11/2006 | Elahmadi et al. | |
| 2006/0280113 A1 | 12/2006 | Huo | |
| 2007/0110177 A1 * | 5/2007 | Molander et al. | 375/260 |
| 2007/0127608 A1 | 6/2007 | Scheim et al. | |
| 2007/0140330 A1 | 6/2007 | Allpress et al. | |
| 2007/0213087 A1 | 9/2007 | Laroia et al. | |
| 2007/0230593 A1 | 10/2007 | Eliaz et al. | |
| 2007/0258517 A1 | 11/2007 | Rollings et al. | |
| 2007/0291719 A1 | 12/2007 | Demirhan et al. | |
| 2008/0002789 A1 | 1/2008 | Jao et al. | |
| 2008/0049598 A1 | 2/2008 | Ma et al. | |
| 2008/0080644 A1 | 4/2008 | Batruni | |
| 2008/0130788 A1 | 6/2008 | Copeland | |
| 2008/0207143 A1 | 8/2008 | Skarby et al. | |
| 2008/0260985 A1 | 10/2008 | Shirai et al. | |
| 2009/0028234 A1 | 1/2009 | Zhu | |
| 2009/0075590 A1 * | 3/2009 | Sahinoglu et al. | 455/39 |
| 2009/0185612 A1 | 7/2009 | McKown | |
| 2009/0290620 A1 | 11/2009 | Tzannes et al. | |
| 2009/0323841 A1 | 12/2009 | Clerckx et al. | |
| 2010/0002692 A1 | 1/2010 | Bims | |
| 2010/0034253 A1 | 2/2010 | Cohen | |
| 2010/0062705 A1 | 3/2010 | Rajkotia et al. | |
| 2010/0166050 A1 | 7/2010 | Aue | |
| 2010/0202505 A1 | 8/2010 | Yu et al. | |
| 2010/0215107 A1 | 8/2010 | Yang | |
| 2010/0284481 A1 | 11/2010 | Murakami et al. | |
| 2010/0329325 A1 | 12/2010 | Mobin et al. | |
| 2011/0064171 A1 | 3/2011 | Huang et al. | |
| 2011/0074500 A1 | 3/2011 | Bouillet et al. | |
| 2011/0074506 A1 | 3/2011 | Kleider et al. | |
| 2011/0090986 A1 | 4/2011 | Kwon et al. | |
| 2011/0164492 A1 | 7/2011 | Ma et al. | |
| 2011/0228869 A1 | 9/2011 | Barsoum et al. | |
| 2011/0310978 A1 | 12/2011 | Wu et al. | |
| 2012/0207248 A1 | 8/2012 | Ahmed et al. | |
| 2013/0028299 A1 | 1/2013 | Tsai | |
| 2013/0044877 A1 | 2/2013 | Liu et al. | |
| 2013/0121257 A1 | 5/2013 | He et al. | |

OTHER PUBLICATIONS

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

Intuitive Guide to Principles of Communications, www.complextoreal.com, Inter Symbol Interference (ISI) and Root-raised Cosine (RRC) filtering, (2002), pp. 1-23 (23 pages).

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. and Nudd, G.R., Department of Computer Science, Univ. of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G. D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog•lu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.

(56) References Cited

OTHER PUBLICATIONS

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686,Nov. 1989.

S. Mita, M. Izumita, N. Doi, and Y. Eto, "Automatic equalizer for digital magnetic recording systems" IEEE Trans. Magn., vol. 25, pp. 3672-3674, 1987.

E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.

W. E. Ryan and A. Gutierrez, "Performance of adaptive Volterra equalizers on nonlinear magnetic recording channels," IEEE Trans. Magn., vol. 31, pp. 3054-3056, Nov. 1995.

X. Che, "Nonlinearity measurements and write precompensation studies for a PRML recording channel," IEEE Trans. Magn., vol. 31, pp. 3021-3026, Nov. 1995.

O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

Miao, George J., Signal Processing for Digital Communications, 2006, Artech House, pp. 375-377.

Xiong, Fuqin. Digital Modulation Techniques, Artech House, 2006, Chapter 9, pp. 447-483.

\* cited by examiner

HIGHLY-SPECTRALLY-EFFICIENT TRANSMISSION USING ORTHOGONAL FREQUENCY DIVISION MULTIPLEXING

CLAIM OF PRIORITY

This patent application makes reference to, claims priority to and claims benefit from:

U.S. Provisional Patent Application Ser. No. 61/662,085 titled "Apparatus and Method for Efficient Utilization of Bandwidth" and filed on Jun. 20, 2012;

U.S. Provisional Patent Application Ser. No. 61/726,099 titled "Modulation Scheme Based on Partial Response" and filed on Nov. 14, 2012;

U.S. Provisional Patent Application Ser. No. 61/729,774 titled "Modulation Scheme Based on Partial Response" and filed on Nov. 26, 2012;

U.S. Provisional Patent Application Ser. No. 61/747,132 titled "Modulation Scheme Based on Partial Response" and filed on Dec. 28, 2012;

U.S. Provisional Patent Application Ser. No. 61/768,532 titled "High Spectral Efficiency over Non-Linear, AWGN Channels" and filed on Feb. 24, 2013; and U.S. Provisional Patent Application Ser. No. 61/807,813 titled "High Spectral Efficiency over Non-Linear, AWGN Channels" and filed on Apr. 3, 2013.

This application is also a continuation-in-part of U.S. patent application Ser. No. 13/755,008 titled "Dynamic Filter Adjustment for Highly-Spectrally-Efficient Communications" and filed on Jan. 31, 2013.

Each of the above applications is hereby incorporated herein by reference in its entirety.

INCORPORATIONS BY REFERENCE

This patent application makes reference to:

U.S. patent application Ser. No. 13/754,964, titled "Low-Complexity, Highly-Spectrally-Efficient Communications," and filed on Jan. 31, 2013, now patented as U.S. Pat. No. 8,582,637;

U.S. patent application Ser. No. 13/754,998, titled "Design and Optimization of Partial Response Pulse Shape Filter," and filed on Jan. 31, 2013;

U.S. patent application Ser. No. 13/755,001, titled "Constellation Map Optimization for Highly Spectrally Efficient Communications," and filed on Jan. 31, 2013;

U.S. patent application Ser. No. 13/755,008, titled "Dynamic Filter Adjustment for Highly-Spectrally-Efficient Communications," and filed on Jan. 31, 2013, now patented as U.S. Pat. No. 8,571,131;

U.S. patent application Ser. No. 13/755,011, titled "Timing Synchronization for Reception of Highly-Spectrally-Efficient Communications," and filed on Jan. 31, 2013, now patented as U.S. Pat. No. 8,559,494;

U.S. patent application Ser. No. 13/755,014, titled "Signal Reception Using Non-Linearity-Compensated, Partial Response Feedback," and filed on Jan. 31, 2013, now patented as U.S. Pat. No. 8,559,496;

U.S. patent application Ser. No. 13/755,018, titled "Feed Forward Equalization for Highly-Spectrally-Efficient Communications," and filed on Jan. 31, 2013, now patented as U.S. Pat. No. 8,599,914;

U.S. patent application Ser. No. 13/755,021, titled "Decision Feedback Equalizer for Highly Spectrally Efficient Communications," and filed on Jan. 31, 2013;

U.S. patent application Ser. No. 13/755,025, titled "Decision Feedback Equalizer with Multiple Cores for Highly-Spectrally-Efficient Communications," and filed on Jan. 31, 2013;

U.S. patent application Ser. No. 13/755,026, titled "Decision Feedback Equalizer Utilizing Symbol Error Rate Biased Adaptation Function for Highly Spectrally Efficient Communications," and filed on Jan. 31, 2013, now patented as U.S. Pat. No. 8,559,498;

U.S. patent application Ser. No. 13/755,028, titled "Coarse Phase Estimation For Highly-Spectrally-Efficient Communications," and filed on Jan. 31, 2013, now patented as U.S. Pat. No. 8,548,097;

U.S. patent application Ser. No. 13/755,039, titled "Fine Phase Estimation for Highly Spectrally Efficient Communications," and filed on Jan. 31, 2013, now patented as U.S. Pat. No. 8,565,363;

U.S. patent application Ser. No. 13/755,972, titled "Multi-Mode Transmitter for Highly-Spectrally-Efficient Communications," and filed on Jan. 31, 2013;

U.S. patent application Ser. No. 13/755,043, titled "Joint Sequence Estimation of Symbol and Phase With High Tolerance Of Nonlinearity," and filed on Jan. 31, 2013, now patented as U.S. Pat. No. 8,605,832;

U.S. patent application Ser. No. 13/755,050, titled "Adaptive Non-Linear Model for Highly-Spectrally-Efficient Communications," and filed on Jan. 31, 2013, now patented as U.S. Pat. No. 8,553,821;

U.S. patent application Ser. No. 13/755,052, titled "Pilot Symbol-Aided Sequence Estimation for Highly-Spectrally-Efficient Communications," and filed on Jan. 31, 2013;

U.S. patent application Ser. No. 13/755,054, titled "Method and System for Corrupt Symbol Handling for Providing High Reliability Sequences," and filed on Jan. 31, 2013, now patented as U.S. Pat. No. 8,571,146;

U.S. patent application Ser. No. 13/755,060, titled "Method and System for Forward Error Correction Decoding with Parity Check for Use in Low Complexity Highly-spectrally-efficient Communications," and filed on Jan. 31, 2013, now patented as U.S. Pat. No. 8,566,687;

U.S. patent application Ser. No. 13/755,061, titled "Method and System for Quality of Service (QoS) Awareness in a Single Channel Communication System," and filed on Jan. 31, 2013;

U.S. patent application Ser. No. 13/756,079, titled "Pilot Symbol Generation for Highly-Spectrally-Efficient Communications," and filed on Jan. 31, 2013;

U.S. patent application Ser. No. 13/755,065, titled "Timing Pilot Generation for Highly-Spectrally-Efficient Communications," and filed on Jan. 31, 2013, now patented as U.S. Pat. No. 8,548,072;

U.S. patent application Ser. No. 13/756,010, titled "Multi-Mode Receiver for Highly-Spectrally-Efficient Communications," and filed on Jan. 31, 2013;

U.S. patent application Ser. No. 13/755,068, titled "Forward Error Correction with Parity Check Encoding for use in Low Complexity Highly-spectrally-efficient Communications," and filed on Jan. 31, 2013, now patented as U.S. Pat. No. 8,572,458;

U.S. patent application Ser. No. 13/756,469, titled "Highly-Spectrally-Efficient Receiver," and filed on Jan. 31, 2013, now patented as U.S. Pat. No. 8,526,523;

U.S. patent application Ser. No. 13/921,665, titled "Highly-Spectrally-Efficient Reception Using Orthogonal Frequency Division Multiplexing," and filed on the same date as this application;

U.S. patent application Ser. No. 13/921,749, titled "Multi-Mode Orthogonal Frequency Division Multiplexing Transmitter for Highly-Spectrally-Efficient Communications," and filed on the same date as this application; and U.S. patent application Ser. No. 13/921,813, titled "Multi-Mode Orthogonal Frequency Division Multiplexing Receiver for Highly-Spectrally-Efficient Communications," and filed on the same date as this application.

Each of the above applications is hereby incorporated herein by reference in its entirety.

TECHNICAL FIELD

Aspects of the present application relate to electronic communications.

BACKGROUND

Existing communications methods and systems are overly power hungry and/or spectrally inefficient. Further limitations and disadvantages of conventional and traditional approaches will become apparent to one of skill in the art, through comparison of such approaches with some aspects of the present method and system set forth in the remainder of this disclosure with reference to the drawings.

BRIEF SUMMARY

Methods and systems are provided for highly-spectrally-efficient communications using orthogonal frequency division multiplexing, substantially as illustrated by and/or described in connection with at least one of the figures, as set forth more completely in the claims.

DETAILED DESCRIPTION

Figure 1A:
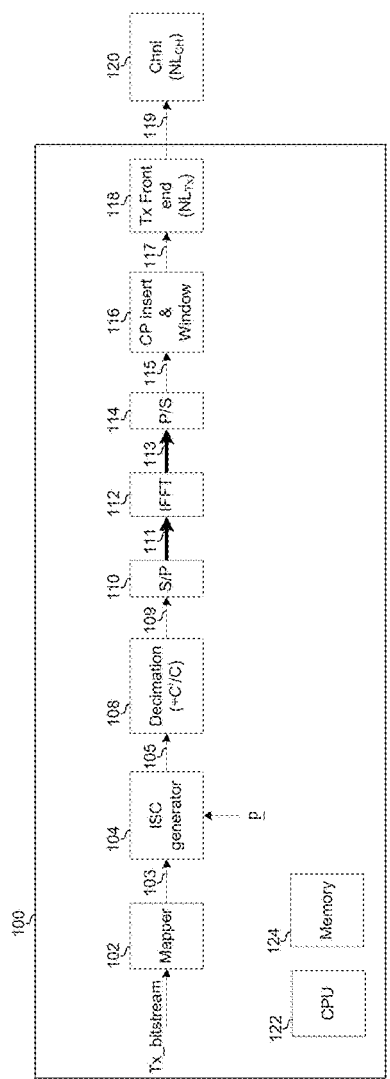
FIG. 1A is a diagram of an example OFDM transmitter.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Orthogonal Frequency Division Multiplexing (OFDM) has gained traction in recent years in high-capacity wireless and wireline communication systems such as WiFi (IEEE Std 802.11n/ac), 3GPP-LTE, and G.hn. One advantage of OFDM is that it can reduce the need for complicated equalization over frequency selective channels. It is particularly powerful in combination with multiple independent spatial streams and multiple antennas, Multiple Input Multiple Output (MIMO) systems. One advantage of OFDM is that it can reduce or eliminate the need for complicated equalization over frequency selective channels. Conventional MIMO-OFDM solutions are based on suboptimal Zero Forcing, SIC (Successive Interference Cancellation), and minimum mean square error (MMSE) receivers. These detection algorithms are significantly inferior to maximum likelihood (ML) and near-ML receivers. Lately, in emerging standards, constellation size continues to increase (256-QAM, 1024-QAM, and so on). The associated ML state space of such solutions is $N^{SS}$, where N and SS stand for the constellation size and total number of MIMO spatial streams, respectively. Consequently, aspects of this disclosure pertain to reduced state/complexity ML decoders that achieve high performance.

Example implementations of the present disclosure may use relatively small constellations with partial response signaling that occupies around half the bandwidth of "ISI-free" or "full response" signaling. Thus, the ML state space is reduced significantly and cost effectiveness of reduced complexity ML detection is correspondingly improved. Additionally, aspects of this disclosure support detection in the presence of phase noise and non-linear distortion without the need of pilot symbols that reduce capacity and spectral efficiency. The spectral compression also provides multidimensional signal representation that improves performance in an AWGN environment as compared to conventional two-dimensional QAM systems. In accordance with an implementation of this disclosure, transmitter shaping filtering may be applied in the frequency domain in order to preserve the independency of the OFDM symbols.

FIG. 1A is a diagram of an example OFDM transmitter. The example transmitter 100 comprises a symbol mapper circuit 102, an inter-symbol correlation (ISC) generation circuit 104, a decimation circuit 108, a serial-to-parallel circuit 108, an inverse fast Fourier transform (IFFT) circuit 112, a parallel-to-serial circuit 114, a cyclic prefix and windowing circuit 116, and a transmit front-end circuit 118. In the example implementation shown, the transmitter transmits into a channel 120.

The symbol mapper circuit 102, may be operable to map, according to a selected modulation scheme, bits of a bitstream to be transmitted ("Tx_bitstream") to symbols. For example, for a quadrature amplitude modulation (QAM) scheme having a symbol alphabet of N (N-QAM), the mapper may map each $Log_2(N)$ bits of the Tx_bitstream to a single symbol represented as a complex number and/or as in-phase (I) and quadrature-phase (Q) components. Although N-QAM is used for illustration in this disclosure, aspects of this disclosure are applicable to any modulation scheme (e.g., pulse amplitude modulation (PAM), amplitude shift keying (ASK), phase shift keying (PSK), frequency shift keying (FSK), etc.). Additionally, points of the N-QAM constellation may be regularly spaced ("on-grid") or irregularly spaced ("off-grid"). Furthermore, the symbol constellation used by the mapper 102 may be optimized for best bit-error rate (BER) performance (or adjusted to achieve a target BER) that is related to log-likelihood ratio (LLR) and to optimizing mean mutual information bit (MMIB) (or achieving a target MMIB). The Tx_bitstream may, for example, be the result of bits of data passing through a forward error correction (FEC) encoder and/or an interleaver. Additionally, or alternatively, the symbols out of the mapper 102 may pass through an interleaver.

The ISC generation circuit 104 may be operable to filter the symbols output by the mapper 102 to generate C' virtual subcarrier values (the terminology "virtual subcarrier" is explained below) having a significant, controlled amount inter-symbol correlation among symbols to be output on different subcarriers (i.e., any particular one of the C' virtual subcarrier values may be correlated with a plurality of the C' symbols output by mapper 102). In other words, the inter-symbol correlation introduced by the ISC generation circuit may be correlation between symbols to be output on different subcarriers. In an example implementation, the ISC generation circuit 104 may be a cyclic filter.

The response of the ISC generation circuit 104 may be determined by a plurality of coefficients, denoted $\underline{p}$ (where underlining indicates a vector), which may be, for example, stored in memory 124. In an example implementation, the ISC generation circuit 104 may perform a cyclic (or, equivalently, "circular") convolution on sets of C' symbols from the mapper 102 to generate sets of C' virtual subcarrier values conveyed as signal 105. In such an implementation, the ISC generation circuit 104 may thus be described as a circulant matrix that multiplies an input vector of C' symbols by a C'×C' matrix, where each row i+1 of the matrix may be a circularly shifted version of row i of the matrix, i being an integer from 1 to C'. For example, for C'=4 (an arbitrary value chosen for illustration only) and $\underline{p}$=[p1 p2 p3 p4], the matrix may be as follows:

$$\begin{bmatrix} p1 & p2 & p3 & p4 \\ p4 & p1 & p2 & p3 \\ p3 & p4 & p1 & p2 \\ p2 & p3 & p4 & p1 \end{bmatrix}$$

In another example, the length of p may be less than C', and zero padding may be used to fill the rows and/or columns to length C' and/or pad the rows and/or columns. For example, C' may be equal to 6 and the matrix above (with $\underline{p}$ having four elements) may be padded to create a six element vector $\underline{p}_Z$=[p1 p2 p3 p4 0 0] and then $\underline{p}_Z$ may be used to generate a 6 by 6 matrix in the same way that $\underline{p}$ was used to generate the 4 by 4 matrix. As another example, only the rows may be padded such that the result is a C'×LP matrix, where LP is the length of $\underline{p}$ (e.g., a 4×6 matrix in the above example). As another example, only the columns may be padded such that the result is a LP×C' matrix, where LP is the length of $\underline{p}$ (e.g., a 6×4 matrix in the above example).

The decimation circuit 108 may be operable to decimate groups of C' virtual subcarrier values down to C transmitted physical subcarrier values (the term "physical subcarrier" is explained below). Accordingly, the decimation circuit 108 may be operable to perform downsampling and/or upsampling. The decimation factor may be an integer or a fraction. The output of the decimator 108 hence comprises C physical subcarrier values per OFDM symbol. The decimation may introduce significant aliasing in case that the ISC generation circuit 104 does not confine the spectrum below the Nyquist frequency of the decimation. However, in example implementations of this disclosure, such aliasing is allowed and actually improves performance because it provides an additional degree of freedom. The C physical subcarrier values may be communicated using C of C+Δ total subcarriers of the channel 120. Δ may correspond to the number of OFDM subcarriers on the channel 120 that are not used for transmitting data. For example, data may not be transmitted a center subcarrier in order to reduce DC offset issues. As another example, one or more subcarriers may be used as pilots to support phase and frequency error corrections at the receiver. Additionally, zero subcarrier padding may be used to increase the sampling rate that separates the sampling replicas and allow the use of low complexity analog circuitry. The C+Δ subcarriers of channel 120 may be spaced at approximately (e.g., within circuit tolerances) BW/(C+Δ) (according to the Nyquist criterion) and with effective OFDM symbol duration of less than or equal to (C+Δ)/BW (according to the Nyquist criterion). Aspects of the invention may, however, enable the receiver to recover the original C' symbols from the received OFDM symbol (Thus the reason for referring to C' as the number of "virtual subcarriers"). This delivery of C' symbols using C effective subcarriers of bandwidth BW/(C+Δ), and OFDM symbol timing of less than or equal to (C+Δ)/BW thus corresponds to a bandwidth reduction of (C'+Δ)/(C+Δ) or, equivalently, a symbol rate increase of C'/C over conventional OFDM systems (assuming the same number, Δ, of unused subcarriers in the conventional system).

To reduce complexity, in an example implementation, the functionalities of 104 and 108 may be merged by calculating only a subset ($C_S$) of the C physical subcarriers subset from C' by taking out the rows of the matrix that are related to the decimated virtual subcarriers of the ISC generating, C'×C' matrix. For example, decimation of factor of 2 may be achieved by eliminating the even column vectors of the C'×C' matrix described in paragraph [0021] (assuming, for purposes of this example, that the information symbol vector (length of C') is a row vector that left multiplies the matrix).

Generally speaking, in an example implementation wherein the circuit 104 is a cyclic filter, methods and systems of designing the ISC generation circuit 104 may be similar to methods and systems described in U.S. patent application Ser. No. 13/754,998 titled "Design and Optimization of Partial Response Pulse Shape Filter," which is incorporated by reference above. Similar to the design of the filter(s) in the single-carrier case described in U.S. patent application Ser. No. 13/754,998, the design of a cyclic filter implementation of the circuit 104 may be based on using the symbol error rate (SER) union bound as a cost function and may aim to maximize the Euclidean distance associated with one or more identified error patterns. Using a shaping filter characterized by the coefficients $\underline{p}$, the distance induced by error pattern $\underline{\epsilon}$ may be expressed as:

$$\delta^2(\underline{\epsilon},\underline{p}) = \Sigma_n |\Sigma_k p_{[n-k]} \epsilon_{[k]}|^2 = \Sigma_k \Sigma_l \epsilon_{[k]} \epsilon^*_{[l]} \Sigma_n p_{[n-k]} p^*_{[n-l]} \quad \text{Eq. 1A}$$

Assuming, for purposes of illustration, a spectral compression factor 2, then, after decimation by 2, EQ. 1A becomes:

$$\delta_2^2(\underline{\epsilon},\underline{p}) = \Sigma_n |\Sigma_k p_{[2n-k]} \epsilon_{[k]}|^2 = \Sigma_n |\Sigma_k \epsilon_{[2n-2k]} p_{[2k]} + \Sigma_k \epsilon_{[2n-2k+1]} p_{[2k-1]}|^2 \quad \text{Eq. 1B}$$

Where the right-hand-side summation relates to odd-indexed symbols and the left-hand-side summation relates to even-indexed symbols. Eq. 1B may then be rewritten as:

$$\delta_2^2(\epsilon, \underline{p}) = \sum_n \left[ \sum_k \sum_m \epsilon_{[2k]} \epsilon^*_{[2m]} p_{[2n-2k]} p^*_{[2n-2m]} + \sum_k \sum_m \epsilon_{[2k-1]} \epsilon^*_{[2m-1]} p_{[2n-2k+1]} p^*_{[2n-2m+1]} + 2 \cdot \text{Real}\left\{ \sum_k \sum_m \epsilon_{[2k]} \epsilon^*_{[2m-1]} p_{[2n-2k]} p^*_{[2n-2m+1]} \right\} \right] \quad \text{Eq. 1C}$$

In Eq. 1C, the first and second summation terms are associated with the distance of the even-indexed and odd-indexed virtual subcarriers respectively. Accordingly, one goal in designing a cyclic filter implementation of ISC generation circuit 104 may be to maximize the first and second terms of Eq. 1C. The third term takes on both positive and negative values depending on the error pattern. In general, this term will reduce the minimum distance related to the most-probable error patterns. Accordingly, one goal in designing a cyclic filter implementation of ISC generation circuit 104 may be to minimize the third term of Eq. 1C (i.e., minimizing cross-correlation between even and odd virtual subcarriers). Additionally or alternatively, a cyclic filter implementation of ISC generation circuit 104 may be designed such that the first and second terms should have similar levels, which may correspond to even-indexed and odd-indexed symbol sequences have comparable distances (i.e., seeking energy balance between even-indexed and odd-indexed virtual subcarriers).

In presence of frequency-selective fading channel, the inter-subcarrier correlation created by 104 (by filtering or by matrix multiplication, for example) may be used to overcome the frequency-selective fading and to improve detection performance at the receiver. The processing of inter-subcarrier correlation may be perceived as "analog interleaving" over the frequency domain that spreads each of the C' information symbols over a plurality of frequency subcarriers. As a result of this "analog interleaving," a notch in one of the subcarriers will have a relatively low impact on detection, assuming that rest of subcarriers that are carrying that information symbol are received with sufficiently-high SNR.

Figure 3:
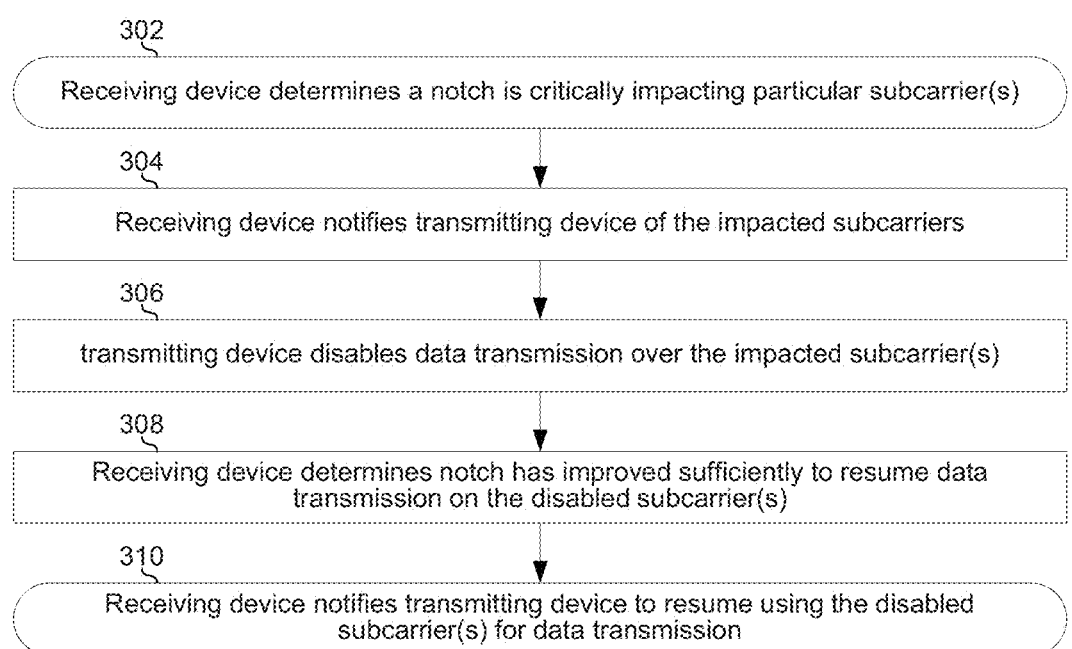
FIG. 3 is a flowchart describing a process for mitigating the effects of frequency-selective fading in highly-spectrally-efficient OFDM communication system.

In case of frequency selective fading channel, feedback from the receiving device may be used to dynamically adapt transmission properties. An example process for such dynamic adaption is shown in FIG. 3.

In block 302 frequency selective fading is causing a significant notch that is critically impacting one or more subcarriers. For example, the notch may be reducing the received SNR of the subcarrier(s) below a certain level (e.g., a level that is predetermined and/or algorithmically controlled during run time).

In block 304, an identification of such impacted subcarrier(s) may be sent from the receiving device to the transmitting device (e.g., over a control channel).

In block 306, in response to receiving the indication sent in block 304, the transmitting device disables transmission of data over the impacted subcarrier(s). The transmitting device may disable transmission of data over the impacted subcarrier(s) by, for example, reconfiguring the mapper 102 (e.g., changing the value of C' and/or configuring the mapper 102 to insert pilot symbols between data symbols), changing p, reconfiguring the decimation circuit 108 (e.g., changing the value of C), and/or reconfiguring the mapping performed by the serial-to-parallel circuit 110.

In block 308, the receiving device may determine that data transmission on the disabled subcarriers should resume.

In block 310, the instruction to resume data transmission on the disabled subcarrier(s) may be sent (e.g., via a control channel). In an example implementation, such a determination may be made by monitoring pilot signal(s) that the transmitting device transmits on the disabled subcarrier(s). For example, the receiving device may monitor a characteristic (e.g., SNR) of the pilot signal(s) and determine to resume use of the subcarriers(s) upon a significant and/or sustained change in the characteristic (e.g., upon SNR of the pilot signal(s) increasing above a determined threshold for a determined amount of time. In an example implementation, the determination to resume data transmission on the disabled subcarrier(s) may be based on the one or more characteristics of subcarriers adjacent to the disabled subcarrier(s). For example, while subcarrier N is disabled, the receiving device may monitor SNR of adjacent subcarriers N−1 and/or N+1, and may decide enable subcarrier N in response to a significant and/or sustained increase in the SNR of subcarrier(s) N−1 and/or N+1. The first example above for SNR estimation of disabled subcarrier(s) which is based on pilots, may be more accurate than the second example which is based on SNR estimation using adjacent subcarriers. However, the second example does not "waste" power on pilot subcarrier(s) transmission thus may provide higher power for the information (modulated) subcarriers assuming that the transmitted power is fixed. The relative increased power of the modulated subcarriers may improve decoding performance (e.g., SER, BER, packet error rate).

Similarly, feedback from the receiving device (e.g., in the form of subcarrier SNR measurements) may be used to adapt the ISC generation circuit 104 and/or decimation circuit 108. Such adaptation may, for example, give relatively-high-SNR subcarriers relatively-high coefficients and relatively-low-SNR subcarriers relatively-low coefficients. Such adaptation of coefficients may be used to optimize communication capacity (or to achieve a target communication capacity) between the transmitting device and the receiving device. The control channel latency and adaptation rate may be controlled to be fast enough to accommodate channel coherence time.

Returning to FIG. 1B, additional, or alternative, design goals for the circuit 104 may stem from a desire to reduce complexity of the sequence estimation in the receiver. As an example, one design goal may be, as described in U.S. patent application Ser. No. 13/754,998, maximizing the magnitude of coefficients of "early" (or low-indexed) taps of a cyclic filter implementation of circuit 104. As another example, one design goal may be, as described in U.S. patent application Ser. No. 13/754,998, minimizing the cumulative power of the "late" (or high-indexed) taps of a cyclic filter implementation of circuit 104.

Figure 1B:
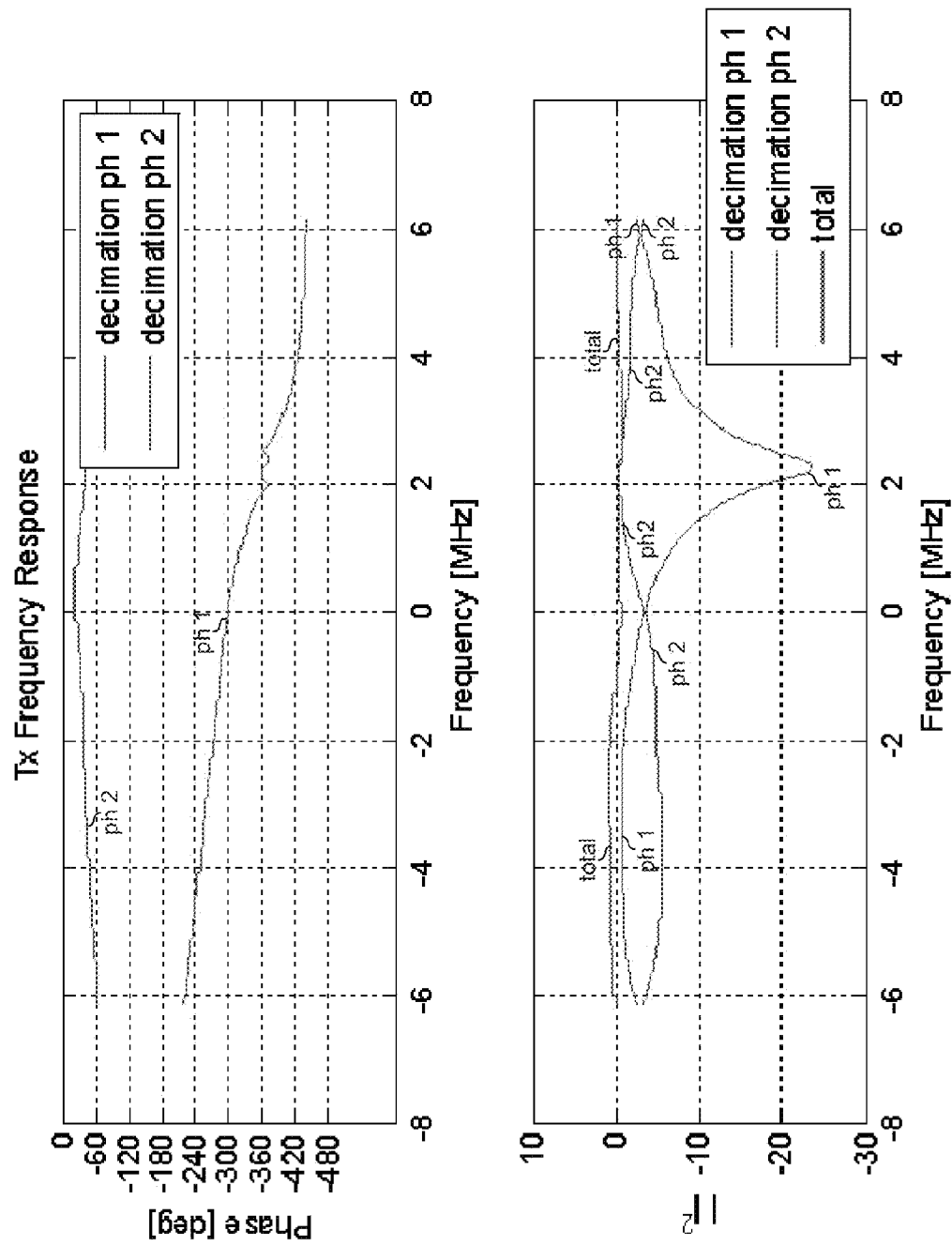
FIG. 1B depicts simulation results of an example cyclic filter for a highly-spectrally-efficient OFDM transmitter.

As shown by the example simulation results in FIG. 1B (compression factor=2 used for purposes of illustration), a complex-valued shaping filter can exploit the full spectrum and make the even-indexed ("ph 1") and odd-indexed responses ("ph 2") substantially orthogonal by using disjoint parts of the spectrum. FIG. 1B shows an example of the frequency response of the even-indexed and odd-indexed coefficients of a cyclic filter implementation of circuit 104 that was designed in accordance with this disclosure. Also, shown in the lower portion of FIG. 1B is the total/combined even and odd response, which, as can be seen, is substantially flat.

Returning to FIG. 1A, the serial-to-parallel circuit 110 may be operable to convert C physical subcarrier values conveyed serially as signal 109 to C physical subcarrier values input conveyed in parallels as signals 111.

In an example implementation, the subcarrier values output by the decimation circuit 108 may be interleaved prior to being input to the circuit 112 and/or the circuit 110 may perform interleaving of the inputted subcarrier values. This interleaver may be operable to improve the tolerance to frequency selective fading caused by multipath that may impose wide notch that spans over several subcarriers. In this case the interleaver may be used to "spread" the notch over non-consecutive (interleaved) subcarriers and therefore reduce the impact of the notch on decoding performance.

Each of the signals 103, 105, 109, and 111 may be frequency-domain signals. The inverse fast Fourier transform (IFFT) circuit 112 may be operable to convert the frequency-domain samples of signals 111 to time-domain samples of signals 113.

The parallel-to-serial circuit 114 may be operable to convert the parallel signals 113 to a serial signal 115.

The circuit 116 may be operable to process the signal 115 to generate the signal 117. The processing may include, for example, insertion of a cyclic prefix. Additionally, or alternatively, the processing may include application of a windowing function to compensate for artifacts that may result when a receiver of the transmitted signal uses the FFT to recover information carried in the transmitted signal. Windowing applied the in transmitter 100 may be instead of, or in addition to, windowing applied in a receiver.

The transmitter front-end 118 may be operable to convert the signal 117 to an analog representation, upconvert the resulting analog signal, and amplify the upconverted signal to generate the signal 119 that is transmitted into the channel 120. Thus, the transmitter front-end 118 may comprise, for example, a digital-to-analog converter (DAC), mixer, and/or power amplifier. The front-end 118 may introduce non-linear distortion and/or phase noise (and/or other non-idealities) to the signal 117. The non-linearity of the circuit 118 may be represented as $NL_{Tx}$ which may be, for example, a polynomial, or an exponential (e.g., Rapp model). The non-linearity may incorporate memory (e.g., Voltera series). In an example implementation, the transmitter 100 may be operable to transmit its settings that relate to the nonlinear distortion inflicted on transmitted signals by the front-end 118. Such transmitted information may enable a receiver to select an appropriate nonlinear distortion model and associated parameters to apply (as described below).

The channel 120 may comprise a wired, wireless, and/or optical communication medium. The signal 119 may propagate through the channel 120 and arrive at a receiver such as the receiver described below with respect to FIG. 2A.

In various example embodiments, subcarrier-dependent bit-loading and time-varying bit-loading may also be used.

Figure 1C:
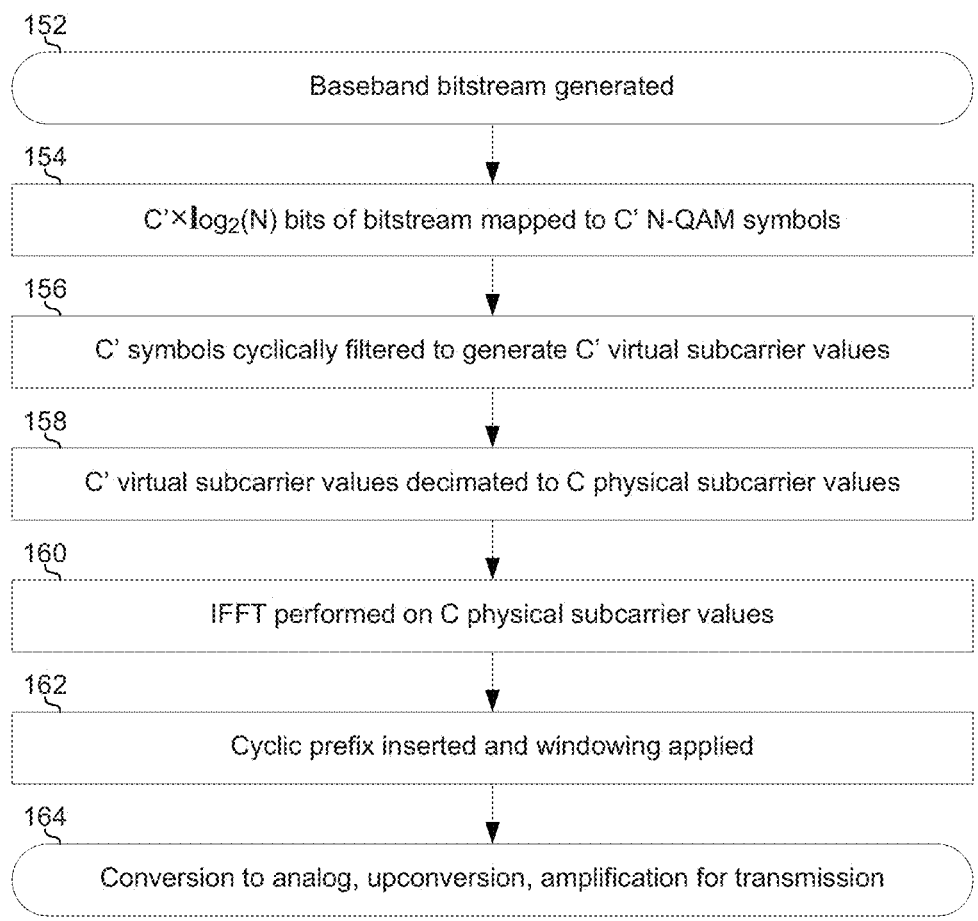
FIG. 1C depicts a flowchart describing operation of an example implementation of a highly-spectrally-efficient OFDM transmitter.

FIG. 1C depicts a flowchart describing operation of an example implementation of a highly-spectrally-efficient OFDM transmitter. The process begins with block 152 in which a baseband bitstream is generated (e.g., by an application running on a smartphone, tablet computer, laptop computer, or other computing device).

In block 154, the baseband bitstream is mapped according to a symbol constellation. In the example implementation depicted, C' (an integer) sets of log 2(N) bits of the baseband bitstream are mapped to C' N-QAM symbols.

In block 156, the C' symbols are cyclically convolved, using a filter designed as described above with reference to FIG. 1A, to generate C' virtual subcarrier values having a significant, controlled amount of inter-symbol correlation among symbols to be output on different subcarriers.

In block 158, the C' virtual subcarrier values output by the ISC generation circuit 104 may be decimated down to C physical subcarrier values, each of which is to be transmitted over a respective one of the C+ΔOFDM subcarriers of the channel 120. In an example implementation, the decimation may be by a factor of between approximately 1.25 and 3.

In block 160, the C physical subcarrier values are input to the IFFT and a corresponding C+Δ time-domain values are output for transmission over C+Δ subcarriers of the channel 120.

In block 162, a cyclic prefix may be appended to the C time domain samples resulting from block 160. A windowing function may also be applied to the samples after appending the cyclic prefix.

In block 164 the samples resulting from block 162 may be converted to analog, upconverted to RF, amplified, and transmitted into the channel 120 during a OFDM symbol period that is approximately (e.g., within circuit tolerances) (C+Δ)/BW.

Figure 2A:
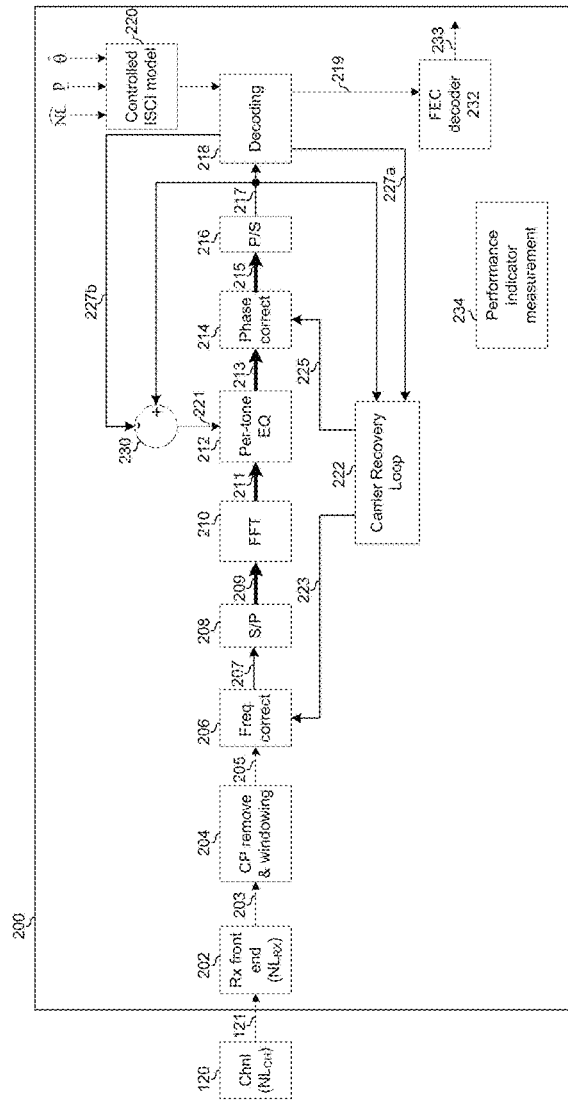
FIG. 2A is a diagram of an example OFDM receiver.

FIG. 2A is a diagram of an example OFDM receiver. The example receiver 200 comprises a front-end 202, a cyclic prefix and windowing circuit 204, a serial-to-parallel conversion circuit 208, a frequency correction circuit 206, a fast Fourier transform (FFT) circuit 210, a per-tone equalizer 212, a phase correction circuit 214, a parallel-to-serial conversion circuit 216, a decoding circuit 218, a controlled combined inter-symbol correlation (ISC) and/or inter-subcarrier interference (ICI) model (Controlled ISCI Model) circuit 220, a carrier recovery loop circuit 222, a FEC decoder circuit 232, and a performance indicator measurement circuit 234.

The receiver front-end 202 may be operable to amplify, downconvert, and/or digitize the signal 121 to generate the signal 203. Thus, the receiver front-end 202 may comprise, for example, a low-noise amplifier, a mixer, and/or an analog-to-digital converter. The front-end 202 may, for example, sample the received signal 121 at least C+Δtimes per OFDM symbol period. Due to non-idealities, the receiver front-end 202 may introduce non-linear distortion and/or phase noise to the signal 203. The non-linearity of the front end 202 may be represented as $NL_{Rx}$ which may be, for example, a polynomial, or an exponential (e.g., Rapp model). The non-linearity may incorporate memory (e.g., Voltera series).

The circuit 204 may be operable to process the signal 203 to generate the signal 205. The processing may include, for example, removal of a cyclic prefix. Additionally, or alternatively, the processing may include application of a windowing function to compensate for artifacts that may result from use of an FFT on a signal that is not periodic over the FFT window. Windowing applied in the transmitter 100 may be instead of, or in addition to, windowing applied in a receiver. The output of the circuit 204 may comprise C samples of the received signal corresponding to a particular OFDM symbol received across C+Δ subcarriers.

The frequency correction circuit 206 may be operable to adjust a frequency of signal 205 to compensate for frequency errors which may result from, for example, limited accuracy of frequency sources used for up and down conversions. The frequency correction may be based on feedback signal 223 from the carrier recovery circuit 222.

The serial-to-parallel conversion circuit 208 may be operable to convert C time-domain samples output serially as the signal 207 to C time-domain samples output in parallel as signals 209.

In an example implementation, where interleaving of the subcarrier values was performed in transmitter, the phase/ frequency-corrected, equalized subcarrier values output at link 215 may be de-interleaved prior to being input to the circuit 218 and/or the circuit 216 may perform de-interleaving of the subcarrier values. In this case the Controlled ISCI Model 220 (comprising the combined ISC model used by the modulator and/or ICI model reflecting the channel non-idealities) should consider the interleaving operation.

Each of the signals 203, 205, 207, and 209 may be time-domain signals. The fast Fourier transform (FFT) circuit 210 may be operable to convert the time-domain samples conveyed as signals 209 to C physical subcarrier values conveyed as signals 211.

The per-tone equalizer 212 may be operable to perform frequency-domain equalization of each of the C physical subcarrier values to compensate for non-idealities (e.g., multipath, additive white Gaussian noise, (AWGN), etc.) experienced by a corresponding one of the C OFDM subcarriers. In an example implementation, the equalization may comprise multiplying a sample of each of signals 211 by a respective one of C complex coefficients determined by the equalization circuit 212. Such coefficients may be adapted from OFDM symbol to OFDM symbol. Adaption of such coefficients may be based on decisions of decoding circuit 218. In an example implementation, the adaptation may be based on an error signal 221 defined as the difference, output by circuit 230, between the equalized and phase-corrected samples of signal 217 and the corresponding reconstructed signal 227b output by the decoding circuit 218. Generation of the reconstructed signal 227b may be similar to generation of the reconstructed signal 203 in the above-incorporated U.S. patent application Ser. No. 13/754,964 (but modified for the OFDM case, as opposed to the single-carrier case described therein) and/or as described below with reference to FIG. 2D.

The phase correction circuit 214 may be operable to adjust the phase of the received physical subcarrier values. The correction may be based on the feedback signal 225 from the carrier recovery circuit 222 and may compensate for phase errors introduced, for example, by frequency sources in the front-end of the transmitter and/or the front-end 202 of the receiver.

The parallel-to-serial conversion circuit 216 may convert the C physical subcarrier values output in parallel by circuit 214 to a serial representation. The physical subcarrier values bits may then be conveyed serially to the decoding circuit 218. Alternatively, 216 may be bypassed (or not present) and the decoding at 218 may be done iteratively over the parallel (vector) signal 215.

The controlled ISCI model circuit 220 may be operable to store tap coefficients $\underline{p}$ and/or nonlinearity model $\hat{NL}$. The stored values may, for example, have been sent to the receiver 200 by the transmitter 100 in one or more control messages. The controlled ISCI model circuit 220 may be operable to convert a time-domain representation of a nonlinearity model to a frequency domain representation. The model 220 may, for example, store (e.g., into a look-up table) multiple sets of filter coefficients and/or nonlinearity models and may be operable to dynamically select (e.g., during operation based on recent measurements) the most appropriate one(s) for the particular circumstances.

The decoding circuit 218 may be operable to process the signal 217 to recover symbols carried therein. In an example implementation, the decoding circuit 218 may be an iterative maximum likelihood or maximum a priori decoder that uses symbol slicing or other techniques that enable estimating individual symbols rather than sequences of symbols. In another example implementation, the decoding circuit 218 may be a sequence estimation circuit operable to perform sequence estimation to determine the C' symbols that were generated in the transmitter corresponding to the received OFDM symbol. Such sequence estimation may be based on maximum likelihood (ML) and/or maximum a priori (MAP) sequence estimation algorithm(s), including reduced-complexity (e.g., storing reduced channel state information) versions thereof. The decoding circuit 218 may be able to recover the C' symbols from the C physical subcarriers (where C'>C) as a result of the controlled inter-symbol correlation and/or aliasing that was introduced by the transmitter (e.g., as a result of the processing by the ISC generation circuit 104 and/or the aliasing introduced by the decimation circuit 108). The decoding circuit 218 may receive, from circuit 220, a frequency-domain controlled ISCI model which may be based on non-linearity, phase noise, and/or other non-idealities experienced by one or more of the C physical subcarrier values arriving at the decoding circuit 218.

The decoding circuit 218 may use the controlled ISCI model to calculate metrics similar to the manner in which a model is used to calculate metrics in above-incorporated U.S. patent application Ser. No. 13/754,964 (but modified for the OFDM case as opposed to the single-carrier case described therein) and/or as described below with reference to FIG. 2C. The decoding circuit 218 may also use the controlled ISCI model provided by circuit 220 to generate signals 227a and 227b, as described herein. In an example implementation, the decoding circuit 218 is operable to get at its input C equalized and phase-corrected physical subcarrier values and generate LLR values associated with the bits of the C' constellation symbols that where originally loaded over the virtual subcarriers of the WAM-OFDM transmitter. The LLRs may be generated by checking multiple hypotheses of C' constellation symbols based on the received samples. The best hypothesis may be used to generate the symbols and hard bits detection. In case of using a soft error correction code, an LLR interface that reflects the reliability of the bits (analog signal) rather than the hard bits (i.e., "0", "1") may be used. A remaining one or more of the hypotheses (the second-best, third-best, etc.) may be used to generate the LLR values. For example, assuming that a particular bit was detected as "1" according to the best hypothesis, the LLR for this bit may be provided from the distance of the best hypothesis to the second best hypothesis that estimates this particular bit as "0". The LLR values for the different virtual subcarriers may be weighted according to their respective SNR. In case of frequency-selective fading channel, each subcarrier may have a different gain that corresponds to a different SNR per subcarrier. Because LLR value reflects the bit reliability, in an example implementation, the LLRs may be weighted according to the appropriate subcarrier gain to achieve Maximum Likelihood performance. In an example implementation, log-likelihood ratios (LLRs) determined in a receiver (e.g., in circuit 218) may have a noise variance component that varies with subcarrier. This may be because the per-subcarrier channel gain (due, for example, to the analog channel selection filter circuits and channel) may vary with frequency but the RF front-end gain at the receiver may be fixed.

For each received OFDM symbol, the circuit 220 may generate a frequency-domain controlled ISCI model of the channel over which the OFDM symbol was received. The controlled ISCI model of 220 may account for non-linear distortion experienced by the received OFDM symbol, phase noise experienced by the received OFDM symbol, and/or other non-idealities. For example, a third-order time domain distortion may be modeled in the frequency domain as:

$$y(t) = x(t) \cdot (1 - r \cdot e^{j\varphi} \cdot |x(t)|^2) = x(t) - r \cdot e^{j\varphi} \cdot x(t) \cdot x^*(t) \cdot x(t)$$

$$Y(\omega) = X(\omega) - r \cdot e^{j\varphi} \cdot X(\omega) \otimes X^*(-\omega) \otimes X(\omega),$$

where:

x(t), $X(\omega)$—are the input signal in the time domain and frequency domain, respectively;

y(t), $Y(\omega)$—are the distorted output signal in the time domain and frequency domain, respectively;

$r \cdot e^{j\varphi}$—is the complex distortion coefficients;

( )*—denotes complex conjugate operator; and $\otimes$—stands for the convolution operator.

The carrier recovery loop circuit 222 may be operable to recover phase and frequency of one or more of the C OFDM subcarriers of the channel 120. The carrier recovery loop 222 may generate a frequency error signal 223 and a phase error signal 225. The phase and/or frequency error may be determined by comparing physical subcarrier values of signal 217 to a reconstructed signal 227a. Accordingly, the frequency error and/or phase error may be updated from OFDM symbol to OFDM symbol. The reconstructed signal 227b may be generated similar to the manner in which the reconstructed signal 207 of the above-incorporated U.S. patent application Ser. No. 13/754,964 (but modified for the OFDM case, as opposed to the single-carrier case described therein) and/or as described below with reference to FIG. 2D.

The performance indicator measurement circuit 234 may be operable to measure, estimate, and/or otherwise determine characteristics of received signals and convey such performance measurement indications to a transmitter collocated with the receiver 200 for transmitting the feedback to the remote side. Example performance indicators that the circuit 234 may determine and/or convey to a collocated transmitter for transmission of a feedback signal include: signal-to-noise ratio (SNR) per subcarrier (e.g., determined based on frequency-domain values at the output of FFT 210 and corresponding decisions at the output of the decoding circuit 218 and/or FEC decoder 232), symbol error rate (SER) (e.g., measured by decoding circuit 218 and conveyed to the circuit 234), and/or bit error rate (BER) (e.g., measured by the FEC decoder and conveyed to the circuit 234).

Figure 2B:
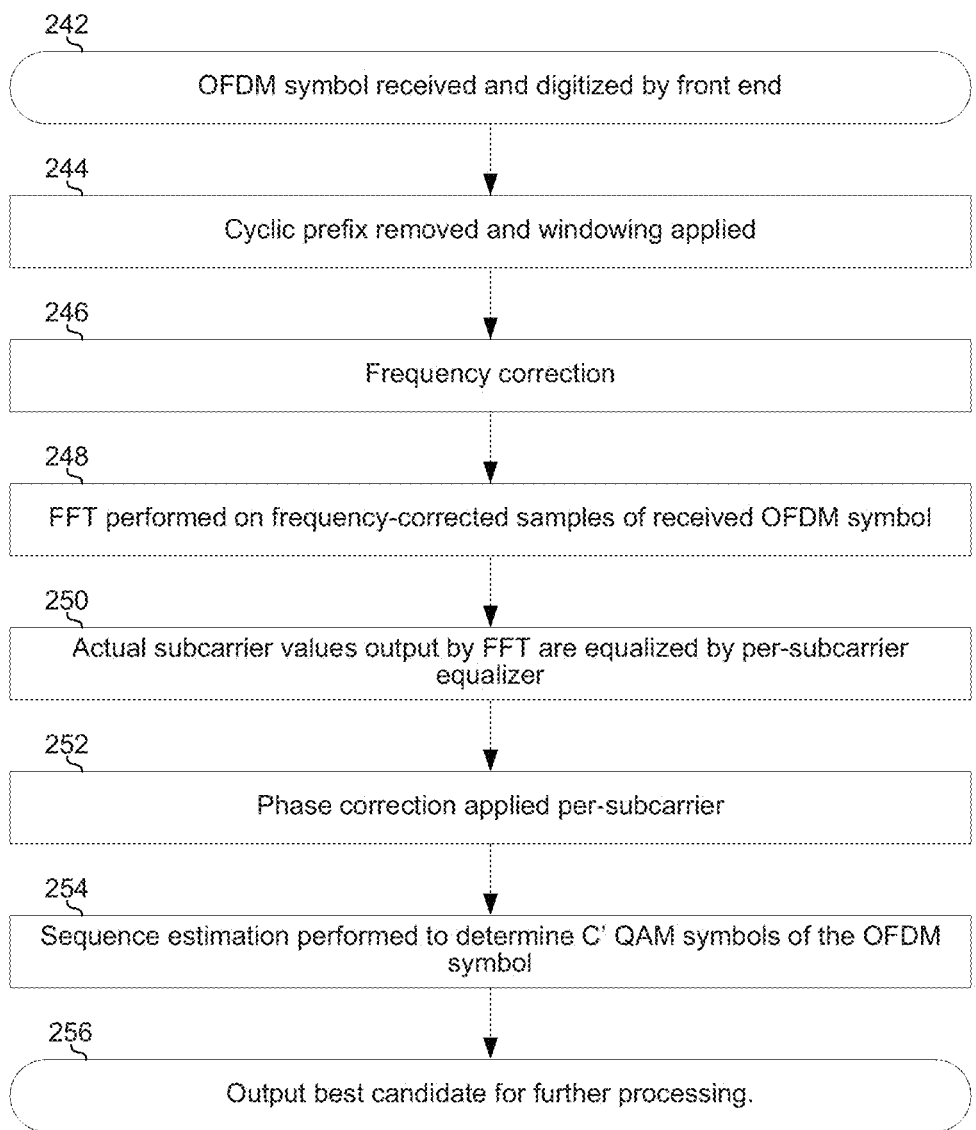
FIGS. 2B and 2C depict a flowchart describing operation of an example implementation of a highly-spectrally-efficient OFDM receiver.
Figure 2C:
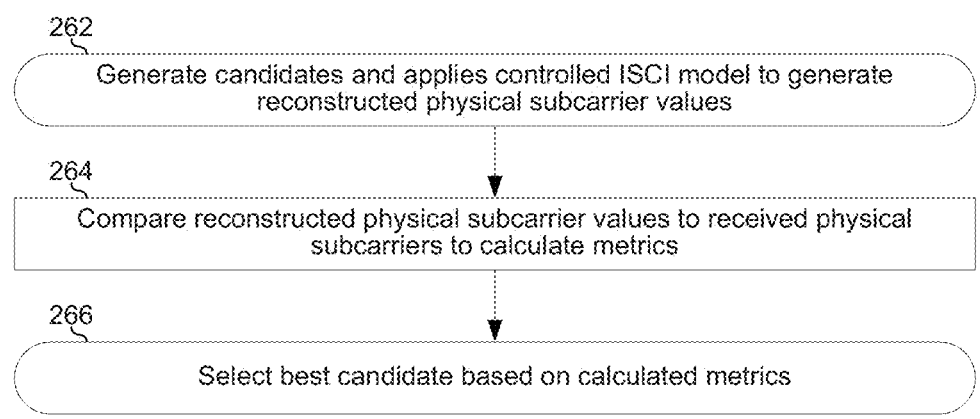

FIGS. 2B and 2C depict a flowchart describing operation of an example implementation of a highly-spectrally-efficient OFDM receiver. The process begins with block 242 in which an OFDM symbol arrives, as signal 121, at front-end 202 and is amplified, down-converted, and digitized to generate C+Δ+P time-domain samples of the OFDM symbol, where P is the size of the cyclic prefix.

In block 244, the cyclic prefix may be removed and a windowing function may be applied.

In block 246, frequency correction may be applied to the time-domain samples based on an error signal 223 determined by the carrier recovery circuit 222.

In block 248, the frequency-corrected time-domain samples are converted to frequency-corrected frequency-domain physical subcarrier values by the FFT circuit 210.

In block 250, the frequency-corrected physical subcarrier values output by the FFT are equalized in the frequency domain by the per-subcarrier equalizer circuit 212.

In block 252, one or more of the frequency-corrected and equalized physical subcarrier values are phase corrected based on a phase correction signal 225 generated by the carrier recovery circuit 222.

In block 254, the vector of C frequency-corrected, equalized, and phase-corrected received physical subcarrier values is input to decoding circuit 218 and sequence estimation is used to determine the best estimates of the vector of C' symbols that resulted in the vector of C frequency-corrected, equalized, and phase-corrected received physical subcarrier values. Example details of metric generation performed during the sequence estimation are described below with reference to FIG. 2C.

In block 256, the best estimate of the vector of C' symbols is determined by decoding circuit 218 and is output as signal 219 to FEC decoder 232, which outputs corrected values on signal 233. Example details of selecting the best candidate vector are described below with reference to FIG. 2C.

Referring to FIG. 2C, in block 262, the decoding circuit 218 generates a plurality of candidate vectors (each candidate vector corresponding to a possible value of the vector of C' symbols generated by the transmitter), and generates a corresponding plurality of reconstructed physical subcarrier vectors by applying the controlled ISCI model to the candidates.

In block 264, the reconstructed physical subcarrier vectors are compared to the vector of frequency-corrected, equalized, and/or phase-corrected received physical subcarrier values to calculate metrics.

In block 266, the candidate vector corresponding to the best metric is selected as the best candidate, and the C' symbols of the best candidate are output as signal 219, to, for example, FEC decoder 232 and/or an interleaver (not shown).

Figure 2D:
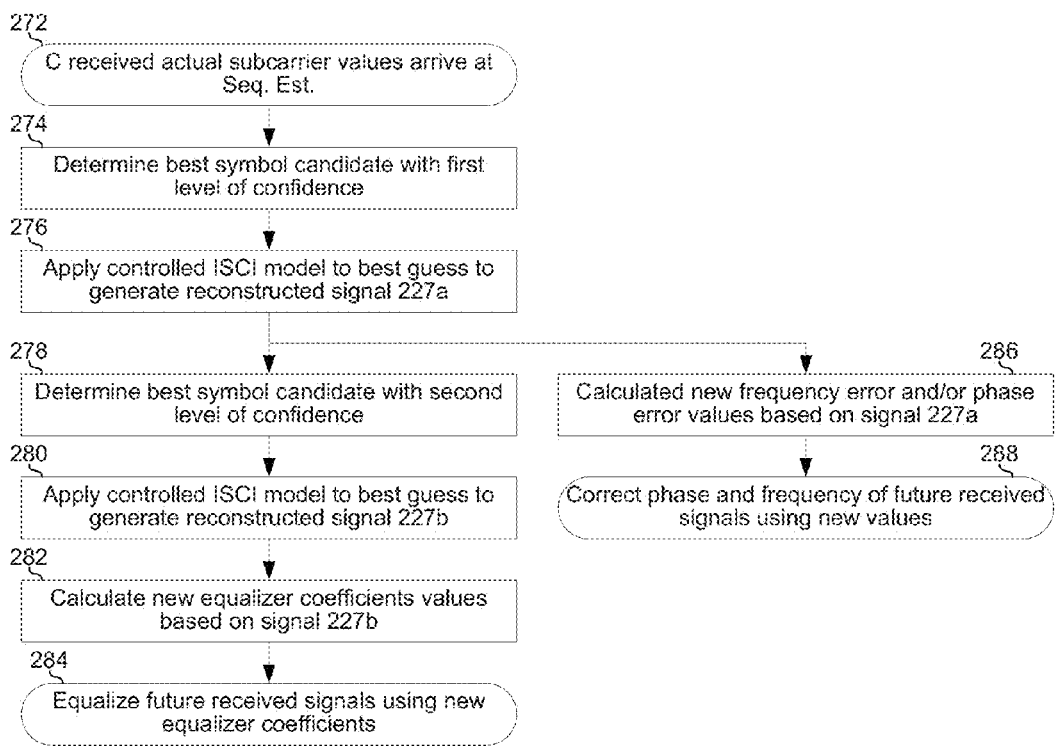
FIG. 2D depicts a flowchart describing operation of an example decoding circuit of a highly-spectrally-efficient OFDM receiver.

FIG. 2D depicts a flowchart describing operation of an example decoding circuit of a highly-spectrally-efficient OFDM receiver. The flowchart begins with block 272 in which a vector of C received physical subcarrier values arrive at decoding circuit 218.

In block 274, the best candidate vector is determined to a first level of confidence. For example, in block 274, the best candidate vector may be determined based on a first number of iterations of a sequence estimation algorithm.

In block 276, the controlled ISCI model may be applied to the best candidate vector determined in block 274 to generate reconstructed signal 227a.

In block 278, the best candidate vector is determined to a second level of confidence. For example, the best candidate determined in block 278 may be based on a second number of iterations of the sequence estimation algorithm, where the second number of iterations is larger than the first number of iterations.

In block 280, the controlled ISCI model may be applied to the best candidate determined in block 278 to generate reconstructed signal 227b.

In block 282, coefficients used by the equalizer 212 are updated/adapted based on the reconstructed signal 227b determined in block 280.

In block 284, subsequent received physical subcarrier values are equalized based on the coefficients calculated in block 282.

Blocks 286 and 288 may occur in parallel with blocks 278-284.

In block 286, the carrier recovery loop 222 may determine frequency and/or phase error based on signal 227a calculated in block 276.

In block 288, samples received during a subsequent OFDM symbol period may be frequency corrected based on the error determined in block 286 and/or subsequent received physical subcarrier values are phase corrected based on the error determined in block 286.

In an example implementation, a first electronic device (e.g., 100), may map, using a selected modulation constellation, each of C' bit sequences to a respective one of C' symbols, where C' is a number greater than one. The electronic device may process the C' symbols to generate C' inter-carrier correlated virtual subcarrier values. The electronic device may decimate the C' virtual subcarrier values down to C physical subcarrier values, C being a number less than C'. The electronic device may transmit the C physical subcarrier values on C orthogonal frequency division multiplexed (OFDM) subcarriers. The transmission may be via a channel having a significant amount of nonlinearity. The significant amount of nonlinearity may be such that it degrades, relative to a perfectly linear channel, a performance metric in said receiver by less than 1 dB, whereas, in a full response communication system, it would degrade, relative to a perfectly linear channel, the performance metric by 1 dB or more. The processing may introduce a significant amount of aliasing such that the ratio of the signal power of the C' virtual subcarrier values prior to the decimating to the signal power of the C physical subcarrier values after the decimating is equal to or less than a threshold signal to noise ratio of a receiver to which the OFDM subcarriers are transmitted (e.g., for a decimation by a factor of 2, P2 is the power in the upper half of the C' virtual subcarrier values). The modulation constellation may be an N-QAM constellation, N being an integer. The bit sequences may be coded according to a forward error correction algorithm. The processing may comprise multiplication of C' symbols by a C'×C' matrix. Row or column length of the matrix may be an integer less than C', such that the multiplication results in a decimation of the C' symbols. The processing may seeks to achieve a target symbol error rate, target bit error rate, and/or target packet error rate in presence of additive white Gaussian noise and a dynamic frequency selective fading channel. The processing may comprises filtering the C' symbols using an array of filter tap coefficients. The filtering may comprise cyclic convolution. The filtering may comprises multiplication by a circulant matrix populated with the filter tap coefficients. The filter tap coefficients may be selected to achieve one or more of: a target symbol error rate, a target bit error rate, and/or a target packet error rate in presence of one or more of: additive white Gaussian noise, dynamic frequency selective fading channel, and non-linear distortion. The filter tap coefficients may be selected based on signal-to-noise ratio (SNR) measurements fed back from a second electronic device that receives communications from the first electronic device.

The electronic device may receive a first message from a second electronic device. In response to the first message, the first electronic device may cease transmission of data on a particular one of the physical subcarriers. The electronic device may receive a second message from the second electronic device. In response to the second message, the first electronic device may resume transmission of data on the particular one of the physical subcarriers. Subsequent to the receiving the first message, and prior to receiving the second message, transmitting a pilot signal on the particular one of the physical subcarriers. The ceasing transmission of data on the particular one of the physical subcarriers may comprise one or more of: changing a value of the number C; and changing a value of the number C'. An OFDM symbol period for the transmitting may be approximately $(C+\Delta)/BW$. Each of the C OFDM subcarriers has a bandwidth of approximately $BW/(C+\Delta)$, where BW is a bandwidth used for the transmitting, and $\Delta$ is the number of non-data-carrying subcarriers within the bandwidth BW. Prior to the transmitting, transforming the C physical subcarrier values to $C+\Delta+P$ time-domain samples using an inverse fast Fourier transform.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Methods and systems disclosed herein may be realized in hardware, software, or a combination of hardware and software. Methods and systems disclosed herein may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out methods described herein. Another typical implementation may comprise an application specific integrated circuit (ASIC) or chip with a program or other code that, when being loaded and executed, controls the ASIC such that is carries out methods described herein.

While methods and systems have been described herein with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method performed in a first electronic device, the method comprising:
mapping, using a modulation constellation, each of C' bit sequences to a respective one of C' symbols, where C' is a number greater than one;
processing said C' symbols to generate C' inter-carrier correlated virtual subcarrier values;
decimating said C' virtual subcarrier values down to C physical subcarrier values, C being an number less than C';
transmitting said C physical subcarrier values on C orthogonal frequency division multiplexed (OFDM) subcarriers;
receiving a first message from a second electronic device;
in response to said first message, ceasing transmission of data on a particular one of said OFDM subcarriers;
receiving a second message from said second electronic device; and
in response to said second message, resuming transmission of data on said particular one of said OFDM subcarriers.

2. The method of claim 1, wherein:
said transmitting is via a channel having a significant amount of nonlinearity;
said significant amount of nonlinearity degrades a performance metric in a receiver by less than 1 dB, relative to a perfectly linear channel; and
in a full response communication system, said significant amount of nonlinearity would degrade said performance metric by 1 dB or more, relative to a perfectly linear channel.

3. The method of claim 1, wherein said modulation constellation is an N-QAM constellation, N being an integer.

4. The method of claim 1, wherein said bit sequences are coded according to a forward error correction algorithm.

5. The method of claim 1, wherein said processing comprises multiplication of said C' symbols by a C'×C' matrix.

6. The method of claim 1, wherein said processing comprises filtering said C' symbols using an array of filter tap coefficients.

7. The method of claim 6, wherein said filtering comprises cyclic convolution.

8. The method of claim 7, wherein said filtering comprises multiplication by a circulant matrix populated with said filter tap coefficients.

9. The method of claim 6, wherein said filter tap coefficients are selected based on signal-to-noise ratio (SNR) measurements fed back from said second electronic device that receives communications from said first electronic device.

10. The method of claim 1, comprising:
subsequent to said receiving said first message and prior to receiving said second message, transmitting a pilot signal on said particular one of said physical subcarriers.

11. The method of claim 1, wherein said ceasing transmission of data on said particular one of said physical subcarriers comprises one or more of:
changing a value of said number C; and
changing a value of said number C'.

12. The method of claim 1, wherein:
an OFDM symbol period for said transmitting is approximately $(C+\Delta)/BW$; and
each of said C OFDM subcarriers has a bandwidth of approximately $BW/(C+\Delta)$,
where BW is a bandwidth used for said transmitting, and $\Delta$ is the number of non-data-carrying OFDM subcarriers within said bandwidth BW.

13. The method of claim 1, comprising, prior to said transmitting, transforming said C physical subcarrier values to $C+\Delta+P$ time-domain samples using an inverse fast Fourier transform, where $\Delta$ is the number of non-data-carrying OFDM subcarriers and P is cyclic prefix size.

14. A method performed in a first electronic device, the method comprising:
mapping, using a modulation constellation, each of C' bit sequences to a respective one of C' symbols, where C' is a number greater than one;
processing said C' symbols to generate C' inter-carrier correlated virtual subcarrier values;
decimating said C' virtual subcarrier values down to C physical subcarrier values, where C is a number less than C';
transmitting said C physical subcarrier values on C orthogonal frequency division multiplexed (OFDM) subcarriers, wherein:
said processing comprises multiplication of said C' symbols by a matrix; and
row or column length of said matrix is an integer less than C', such that said multiplication results in said decimating of said C' symbols.

15. A method performed in a first electronic device, the method comprising:
mapping, using a modulation constellation, each of C' bit sequences to a respective one of C' symbols, where C' is a number greater than one;
processing said C' symbols to generate C' inter-carrier correlated virtual subcarrier values;
decimating said C' virtual subcarrier values down to C physical subcarrier values, where C is a number less than C';
transmitting said C physical subcarrier values on C orthogonal frequency division multiplexed (OFDM) subcarriers; and
configuring said processing based on feedback indicating a symbol error rate, bit error rate, and/or packet error rate, wherein said configuring seeks to achieve a target symbol error rate, target bit error rate, and/or target packet error rate in presence of additive white Gaussian noise and a dynamic frequency selective fading channel.

16. A method performed in a first electronic device, the method comprising:
mapping, using a modulation constellation, each of C' bit sequences to a respective one of C' symbols, where C' is a number greater than one;
processing said C' symbols to generate C' inter-carrier correlated virtual subcarrier values, wherein said processing comprises filtering said C' symbols using an array of filter taps;
decimating said C' virtual subcarrier values down to C physical subcarrier values, where C is a number less than C';
transmitting said C physical subcarrier values on C orthogonal frequency division multiplexed (OFDM) subcarriers, wherein said filtering comprises cyclic convolution; and
selecting said filter tap coefficients based on feedback indicating a symbol error rate, bit error rate, and/or packet error rate, wherein said selecting seeks to achieve one or more of: a target symbol error rate, a target bit error rate, and/or a target packet error rate in presence of one or more of: additive white Gaussian noise, dynamic frequency selective fading channel, and non-linear distortion.

17. An electronic device comprising:
a filter circuit operable to process a quantity, C', of symbols to generate C' virtual subcarrier values, wherein there is inter-carrier correlation among said C' virtual subcarriers values, and C' is a number;
a decimation circuit operable to decimate said C' virtual subcarrier values down to C physical subcarrier values, wherein C is a number less than C';
a transform circuit operable transform said C physical subcarrier values to $C+\Delta+P$ time-domain samples, where $\Delta$ is the number of non-data-carrying OFDM subcarriers and P is cyclic prefix size;
a front-end circuit operable to transmit said time-domain samples into a channel,
wherein:
said filter circuit is configured to perform a cyclic convolution of said C' symbols;
said cyclic convolution comprises multiplication by a circulant matrix populated with filter tap coefficients and zeros; and
said decimation is realized by said circulant matrix having a dimension less than C'.

18. The electronic device of claim 17, wherein each of said C' symbols is an N-QAM symbol, N being an integer.

19. The electronic device of claim 17, wherein said electronic device is operable to transmit tap coefficients of said filter circuit to a receiver.

20. The electronic device of claim 17, wherein said electronic device is operable to transmit coefficients of said filter circuit such that a receiver may receive the coefficients and update its controlled combined inter-symbol correlation and/or inter-subcarrier interference (ISCI) model.

21. The electronic device of claim 17, wherein said electronic device is operable to transmit settings of said front-end circuit that enable a receiver to determine a nonlinear distortion model.

22. An electronic device comprising:
a filter circuit operable to process a quantity, C', of symbols to generate C' virtual subcarrier values, wherein:
there is inter-carrier correlation among said C' virtual subcarriers values, and C' is a number; and
said filter circuit is operable to select said filter tap coefficients based on feedback indicating one or more of symbol error rate, bit error rate, and/or packet error rate to achieve one or more target performance metrics in presence of additive white Gaussian noise and a dynamic frequency selective fading channel;
a decimation circuit operable to decimate said C' virtual subcarrier values down to C physical subcarrier values, where C is a number less than C';
a transform circuit operable transform said C physical subcarrier values to C+Δ+P time-domain samples, where Δ is a number equal to the number of non-data-carrying subcarriers and P is cyclic prefix size; and
a front-end circuit operable to transmit said time-domain samples into a channel.

23. An electronic device comprising:
a filter circuit operable to process a quantity, C', of symbols to generate C' virtual subcarrier values, wherein there is inter-carrier correlation among said C' virtual subcarriers values, and C' is a number;
a decimation circuit operable to decimate said C' virtual subcarrier values down to C physical subcarrier values, where C is a number less than C';
a transform circuit operable transform said C physical subcarrier values to C+Δ+P time-domain samples, where Δ is the number of non-data-carrying OFDM subcarriers and P is cyclic prefix size; and
a front-end circuit operable to transmit said time-domain samples into a channel, wherein said electronic device is operable to:
in response to a first message from a second electronic device, cease transmission of data on a particular one of said OFDM subcarriers; and
in response to a second message from said second electronic device, resume transmission of data on said particular one of said OFDM subcarriers.

24. The electronic device of claim 23, wherein said electronic device is operable to, subsequent to said cessation of transmission of data on said particular one of said physical subcarriers and prior to resuming transmission of data on said particular one of said physical subcarriers, transmit a pilot signal on said particular one of said physical subcarriers.

* * * * *